(12) United States Patent
Whittenberger

(10) Patent No.: US 6,920,920 B2
(45) Date of Patent: Jul. 26, 2005

(54) HEAT EXCHANGER

(75) Inventor: William A. Whittenberger, Leavittsburg, OH (US)

(73) Assignee: Catacel Corporation, Leavittsburg, OH (US)

( * ) Notice: Subject to any disclaimer, the term of this patent is extended or adjusted under 35 U.S.C. 154(b) by 14 days.

(21) Appl. No.: 10/417,410

(22) Filed: Apr. 16, 2003

(65) Prior Publication Data

US 2004/0206486 A1 Oct. 21, 2004

(51) Int. Cl.[7] ................................................. F28D 9/00
(52) U.S. Cl. ....................................................... 165/165
(58) Field of Search ................................ 165/164, 165; 422/173

(56) References Cited

U.S. PATENT DOCUMENTS

| | | | | | |
|---|---|---|---|---|---|
| 326,839 | A | * | 9/1885 | Braithwaite et al. | 165/166 |
| 2,019,351 | A | * | 10/1935 | Lathrop | 165/165 |
| 3,372,743 | A | * | 3/1968 | Pall et al. | 165/166 |
| 5,105,617 | A | * | 4/1992 | Malohn | 60/39.511 |
| 5,170,624 | A | * | 12/1992 | Cornelison et al. | 60/300 |
| 5,250,489 | A | * | 10/1993 | Dalla Betta et al. | 502/262 |
| 5,512,250 | A | * | 4/1996 | Betta et al. | 422/173 |
| 5,584,341 | A | * | 12/1996 | Sabin et al. | 165/166 |
| 5,700,434 | A | * | 12/1997 | Gaiser | 422/173 |
| 6,059,023 | A | * | 5/2000 | Kurematsu | 165/165 |
| 6,098,396 | A | * | 8/2000 | Wen et al. | 60/777 |
| 6,192,975 | B1 | * | 2/2001 | Yanai et al. | 165/165 |
| 6,207,116 | B1 | | 3/2001 | Heed | |
| 6,244,333 | B1 | * | 6/2001 | Bergh et al. | 165/165 |
| 6,408,941 | B1 | * | 6/2002 | Zuo | 165/165 |
| 2002/0148602 | A1 | * | 10/2002 | Nakamura | 165/165 |

* cited by examiner

Primary Examiner—Teresa J. Walberg
(74) Attorney, Agent, or Firm—William H. Eilberg (57) ABSTRACT

A heat exchanger is made from a single piece of metal foil. The foil is coated with catalyst, corrugated with herringbone or skew corrugations, except along narrow flat areas near its edges, and folded back and forth upon itself. The folded metal structure is blocked off, except at regions near the flat areas, and enclosed in a container. A first gas stream flows into one set of folds, in a path which includes the flat areas and the channels formed by the corrugations. A second gas stream similarly flows into the other set of folds. The two streams are in thermal contact, but do not mix. The heat exchanger is especially useful in operating a catalytic fuel reformer, or in other applications involving catalytic processes. Alternative embodiments use straight corrugations to create straight channels that minimize the pressure drop through the heat exchanger.

45 Claims, 7 Drawing Sheets

HEAT EXCHANGER

BACKGROUND OF THE INVENTION

The present invention relates to the field of heat exchange, and provides a heat exchanger especially suited for use in a catalytic fuel reformer.

In fuel reforming reactions, hydrogen is produced from methane, or from other hydrocarbons, especially for the purpose of operating a fuel cell. In a fuel cell, hydrogen is consumed in the process of producing electric power, and therefore a continuous supply of hydrogen is required. These fuel reforming reactions may be either endothermic, such as in the case of steam reforming, or exothermic, such as in the case of catalytic partial oxidation. All involve the need to add heat to, or to remove heat from, the reforming reaction. Thus, such reactions require a method of heat exchange.

In copending patent application Ser. No. 10/211,083, filed Aug. 2, 2002, and Ser. No. 10/347,130, filed Jan. 17, 2003, the disclosures of which are incorporated by reference herein, there are described steam reformers in which the heat required for the steam reforming is provided by catalytic combustion of a fuel. The steam reforming reaction occurs in channels that are in heat exchange relationship with combustion channels. In the above-cited applications, a conventional heat exchanger provides a structure that defines the necessary combustion and reforming channels.

The conventional heat exchanger used in the above-cited applications is not a perfect choice for use in catalytic steam reforming or for other catalytic reforming reactions. The conventional heat exchanger is made of a plurality of rigid and relatively heavy plates which are carefully welded together to prevent leakage of gas. This construction substantially increases the cost of the device. Moreover, it is difficult to apply a catalyst coating to all of the interior surfaces of the finished heat exchanger.

The present invention solves the above-described problems by providing a heat exchanger that can be built from a piece of metal foil. The present heat exchanger avoids most of the welding required in conventional heat exchangers, and the use of thin foil promotes efficient heat transfer between adjacent channels. Also, it is easy to apply a catalyst coating to all of the interior surfaces of the present heat exchanger, due to its unique construction.

SUMMARY OF THE INVENTION

In a first preferred embodiment, the heat exchanger of the present invention includes a generally rectangular piece of metal which is coated with a catalyst, and which is corrugated except along a pair of flat areas near the longitudinal edges of the metal piece. The corrugations are herringbone or skew corrugations. Either or both sides of the metal may be coated with catalyst, and different catalysts may be applied to different sides of the metal, according to the intended use of the heat exchanger.

The corrugated and coated metal piece is folded back and forth upon itself. The herringbone or skew corrugations prevent adjacent folds from nesting. The longitudinal edges, as well as the regions of the folds, are blocked off, except near the flat areas, which will define manifolds for distribution and collection of gas. The preferred means of blocking portions of the metal piece is to enclose it within one or more sections of insulating blanket material, the sections defining openings comprising a pair of gas inlets and a pair of gas outlets. The blanketed metal structure is then enclosed within a metal container.

Due to the intentional blockage of the edges of the folded metal, gas does not flow along the "traditional" path, but instead is made to flow along a path that includes two generally right-angle turns. In particular, gas flows in channels defined by the flat areas, and in channels defined by the corrugations. The channels defined by the corrugations comprise the major portion of each path for gas flow through the heat exchanger.

The heat exchanger thus provides a structure for bringing two disparate gas streams into thermal contact, while preventing the two streams from mixing.

In an alternative embodiment, the piece of metal has straight corrugations, and when it is folded upon itself, a plurality of flat metal pieces are inserted into each fold. If a given side of the heat exchanger is to operate catalytically, the metal pieces, as well as the folded strip, are coated, on that side, with catalyst. The flat pieces prevent nesting of adjacent folds.

In still another alternative embodiment, the folded piece of metal is coated with catalyst but is uncorrugated. A plurality of cut pieces of corrugated metal, having straight corrugations except for flat areas near each end, are inserted in the folds. Again, the cut pieces prevent nesting of the folds, and the flat areas function in the manner described with respect to the other embodiments.

Both of the above-described alternative embodiments use straight corrugations, which define straight and short channels that minimize the pressure drop through the heat exchanger.

The present invention therefore has the primary object of providing a heat exchanger.

The invention has the further object of providing a heat exchanger which is especially useful in a catalytic fuel reformer and in other applications involving catalytic processes.

The invention has the further object of providing a relatively inexpensive and simple way to make a heat exchanger for bringing two gas streams into thermal contact.

The invention has the further object of providing a heat exchanger which requires minimal welding, and which uses metal foil to promote efficient heat exchange.

The invention has the further object of providing a heat exchanger whose surfaces can be easily and thoroughly coated with catalyst during the manufacturing process.

The invention has the further object of providing a method of making a heat exchanger.

The invention has the further object of providing a heat exchanger which is especially useful in applications in which a large pressure drop must be avoided.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
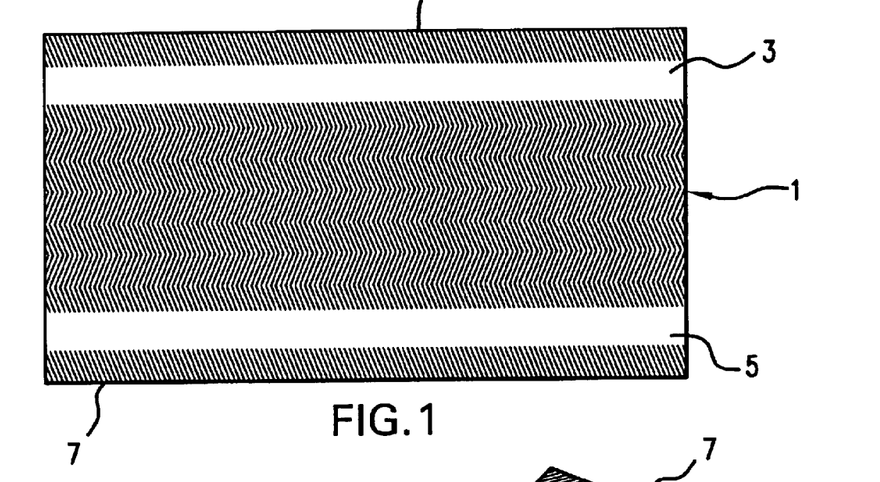
FIG. 1 provides a plan view of a piece of the modified partly-corrugated metal foil used to make the heat exchanger of the present invention, the foil having herringbone corrugations.
Figure 2:
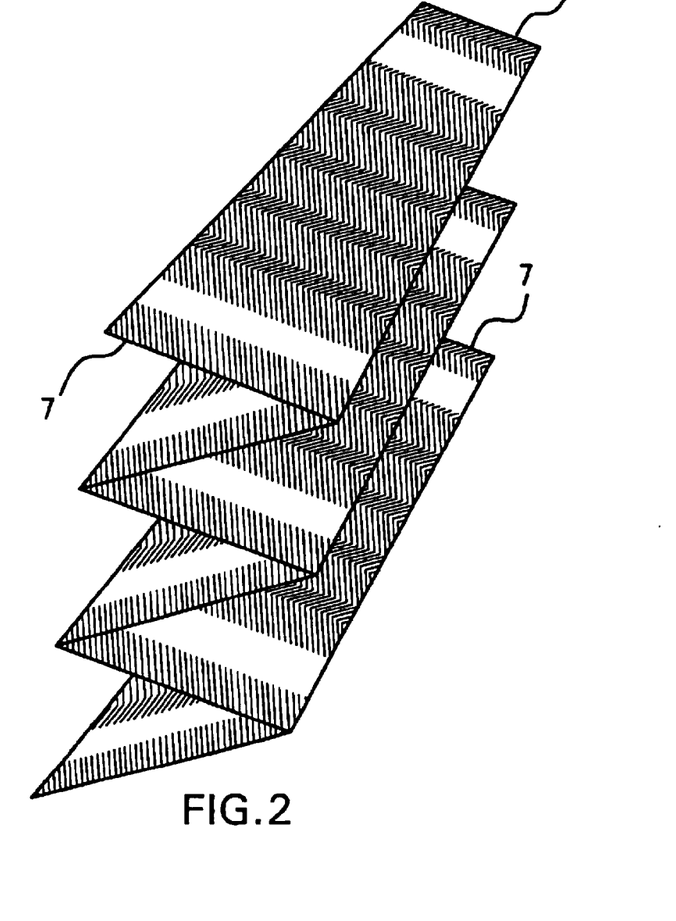
FIG. 2 provides a perspective view showing the folding of the metal foil of FIG. 1 into a zig-zag pattern, in making the heat exchanger of the present invention.
Figure 3A:
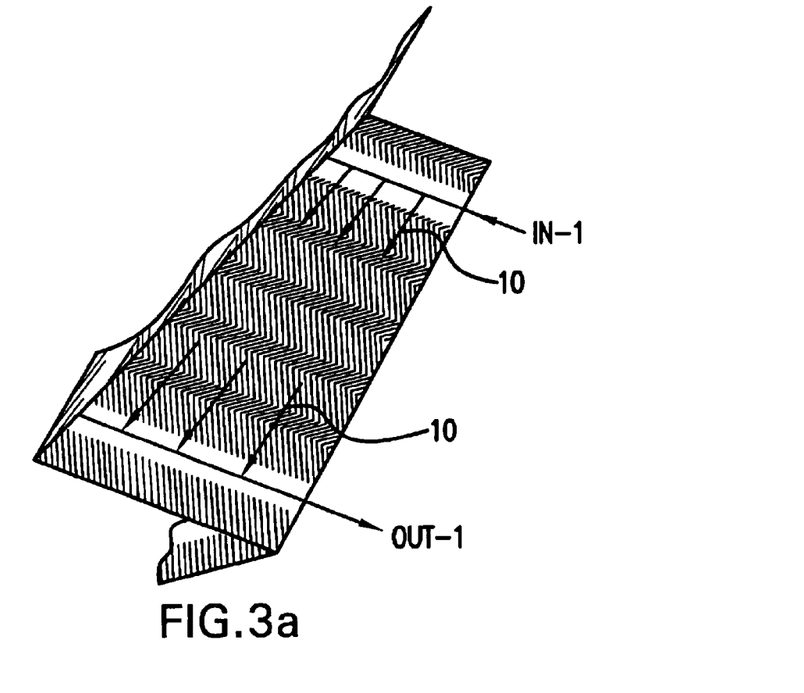
FIGS. 3a and 3b provide fragmentary perspective views of portions of the heat exchanger of the present invention, illustrating the flow of gas through the exchanger.
Figure 3B:
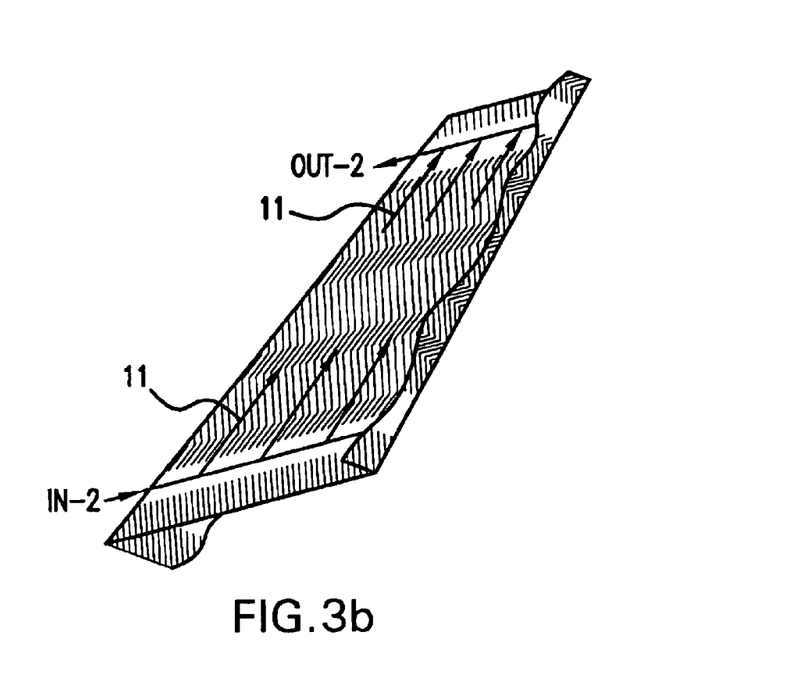

FIGS. 1–3 illustrate the basic construction of the heat exchanger of the present invention. The heat exchanger is made from a generally rectangular piece or strip of corrugated metal foil 1. In the embodiment of FIG. 1, the corrugations define a herringbone pattern. The piece of foil includes two uncorrugated areas 3 and 5 which extend along the entire length of the foil. In one example, the uncorrugated areas 3 and 5 can be about one-half inches wide and located about one-half inches from the respective longitudinal edges 7 of the foil. The invention is not limited to any particular dimensions, however. In the more general case, the uncorrugated areas have a width which is small relative to the width of the foil, and are spaced apart from the longitudinal edges of the foil by a distance approximately equal to their width.

If the heat exchanger is to be used in a catalytic process, the foil is preferably coated with catalyst before it is corrugated. For example, if the heat exchanger is to be used as an autothermal catalytic steam reformer, one side of the foil is coated with a combustion catalyst and the other side is coated with a steam reforming catalyst. The application of catalyst coatings to metal surfaces, especially metal foils, is well known in the art. Examples of patents describing techniques for applying catalyst coatings to metal surfaces include U.S. Pat. Nos. 4,576,800, 4,601,999, 4,711,009, 4,762,567, 5,202,303, 6,060,173, the disclosures of which are all incorporated by reference herein. The heat exchanger of the present invention may use the techniques described in the above-cited patents, or other methods.

Figure 9A:
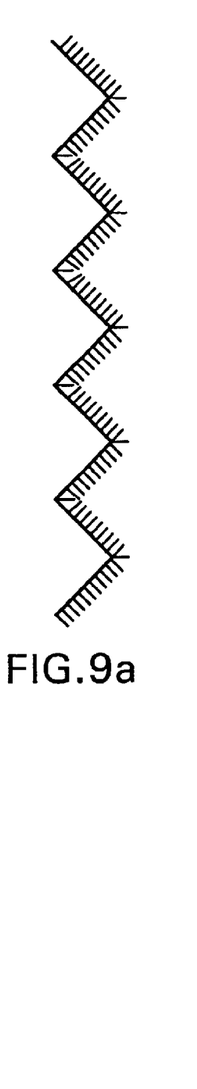
FIGS. 9a–9d provide diagrams representing end views of a piece of corrugated foil that has been coated with catalyst, in various configurations, according to the present invention.
Figure 9B:
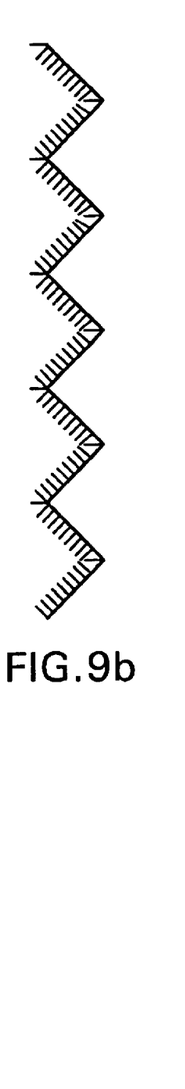
Figure 9C:
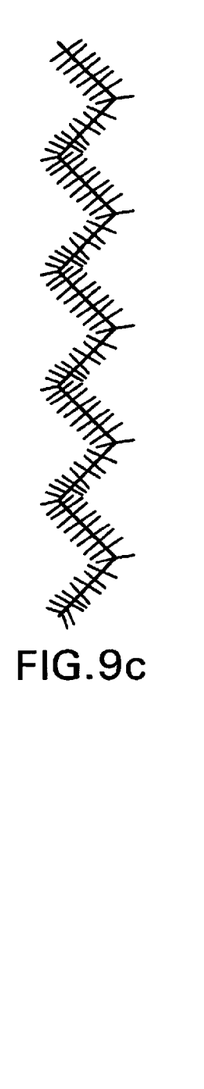
Figure 9D:
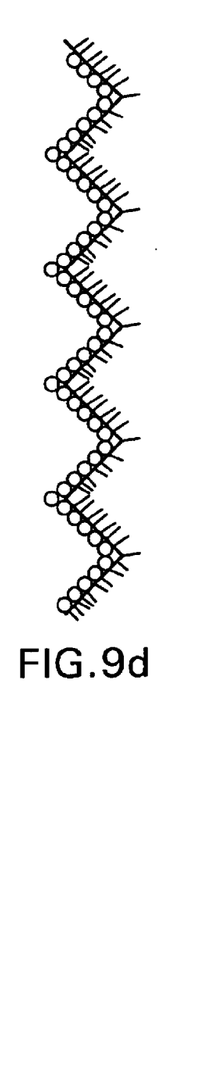

FIGS. 9a–9d represent end views of a corrugated foil, showing various ways in which the coating may be done. In FIG. 9a, the right-hand side of the foil (as viewed in the figure) is coated, the coating being represented symbolically by a plurality of small straight lines extending from the foil, and the left-hand side is uncoated. In FIG. 9b, the left-hand side is coated, and the right-hand side is uncoated. In FIG. 9c, both sides are coated. In FIG. 9d, both sides are coated, but with different catalysts, the coating on the left-hand side being symbolically represented by a plurality of small circles.

The heat exchanger can be used in non-catalytic applications, and in such cases, there may not be any catalyst coating at all.

Whether the heat exchanger is coated on one or both sides, and whether the coatings on the two sides are the same or different, depends on the requirements of the particular reaction(s) being catalyzed.

As shown in FIG. 2, the foil 1 is folded back and forth upon itself, in a zig-zag pattern, to form a stack or honeycomb. FIG. 2 shows only several folds, but in practice, there could be hundreds of folds. Also, for purposes of illustration, the folds are shown in a partially finished state. When the folding is complete, each fold lies adjacent to and substantially parallel to the next fold, the corrugations maintaining a spacing between adjacent folds and defining channels for gas flow.

The herringbone corrugations insure that, when the foil is folded, the folds do not nest together. Thus, the herringbone corrugations comprise one means of maintaining a spacing between adjacent folds. Instead of herringbone corrugations, one could use skew corrugations, i.e. corrugations which are non-perpendicular to the longitudinal axis of the foil.

In a "traditional" heat exchanger of the type described so far, gas would flow through the structure in one direction only, namely across the width of the foil, which is through the channels defined by the corrugations. However, in the present invention, this traditional flow path is intentionally blocked off, by suitable means to be described below. The ends of the heat exchanger are blocked in the vicinity of the longitudinal edges 7, so that gas cannot flow into or out of the heat exchanger in a straight path. Instead, because the ends are blocked, the paths for entry and exit of gas are defined by the uncorrugated areas 3 and 5. FIGS. 3a and 3b illustrate the flow paths.

In FIG. 3a, a first gas stream enters the heat exchanger at the position labeled IN-1, flowing in a channel formed by one of the uncorrugated areas. Then, the gas stream makes a left-hand turn, flowing through channels defined by the corrugations, in the direction indicated by arrows 10. When the gas stream reaches the uncorrugated area at the other end of the strip, it again makes a left-hand turn and exits the heat exchanger at the position labeled OUT-1.

FIG. 3a explicitly shows only one fold of the strip, but it will be appreciated that the gas flowing into the heat exchanger from the right-hand side, as shown in the figure, will simultaneously enter a plurality of folded areas, all of which are accessible to gas flowing from the right-hand side. The flat areas thus comprise manifolds which distribute the gas from the folded edge, into the main body of the honeycomb, and collect the gas as it leaves the heat exchanger. The incoming stream is therefore effectively divided into a plurality of sub-streams, each of which flows through channels in a different fold of the heat exchanger.

FIG. 3b shows the flow path for a second gas stream, which approaches the heat exchanger from the left-hand side. This second stream enters the exchanger at the position labeled IN-2, makes a left-hand turn, and flows in the direction indicated by arrows 11. The gas flows along the width of the strip, and exits at the position labeled OUT-2. As before, the second gas stream is, in actuality, divided into a plurality of sub-streams.

The gas makes the required right-angle turns due to pressure that moves the gas stream, and due to the fact that, with the edges blocked off as described, the desired path is the only path available to the gas.

Due to the zig-zag construction of the heat exchanger, there is no fluid communication between the first stream and the second stream. The folds accessible to the first stream are inaccessible to the second stream, and vice versa. Moreover, again due to the zig-zag construction, these folds are perfectly interleaved. For a given folded portion of the foil, gas from the first stream flows on one side, and gas from the second stream flows on the other side, and the two gas streams do not mix. Heat transfer occurs by thermal conduction through the foil. The foil thus allows the streams to come into thermal contact.

Figure 4:
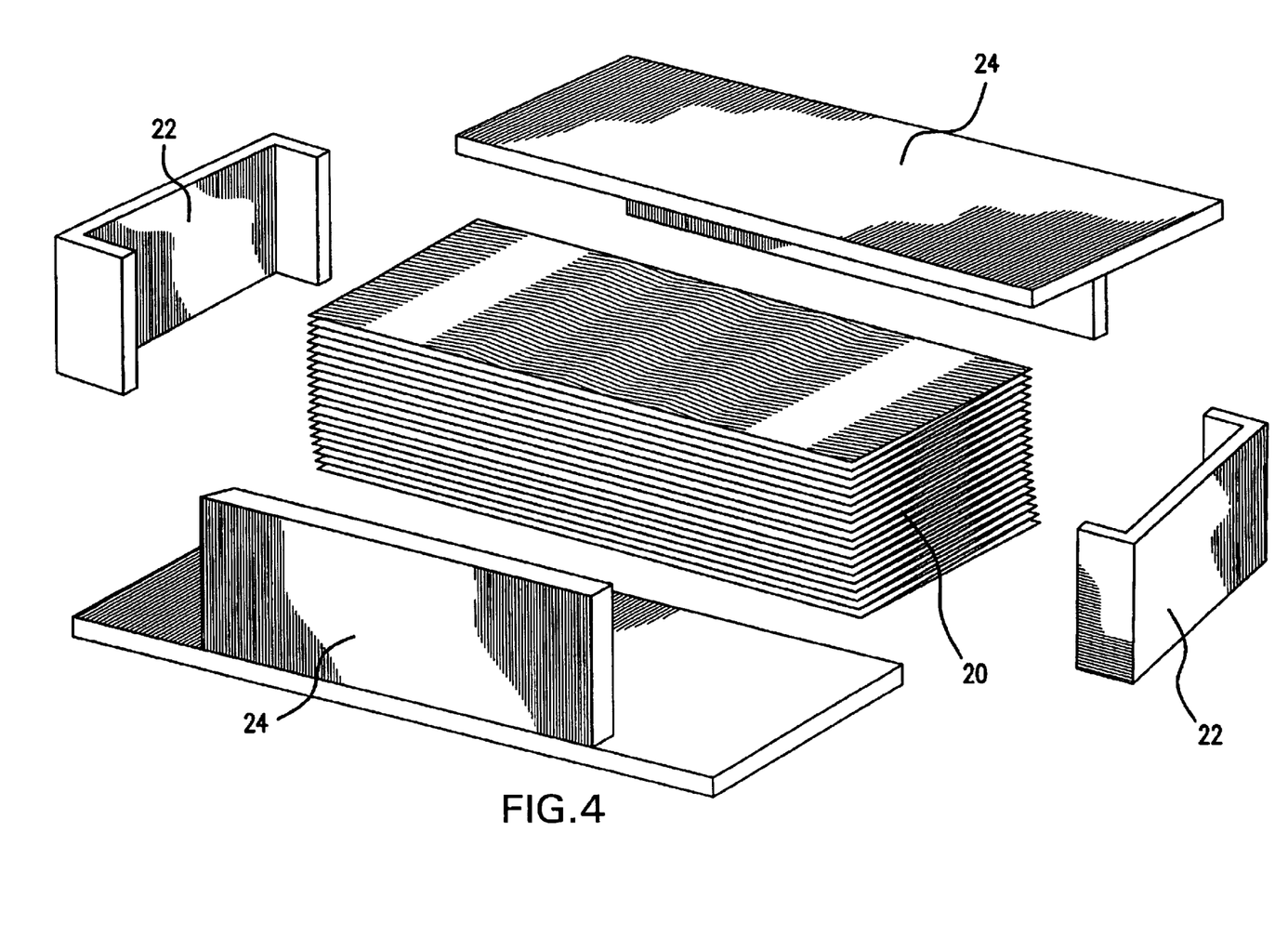
FIG. 4 provides an exploded perspective view showing the folded metal defining the heat exchanger of the present invention, and pieces of a blanket material used to provide insulation and to block off certain portions of the heat exchanger.
Figure 5:
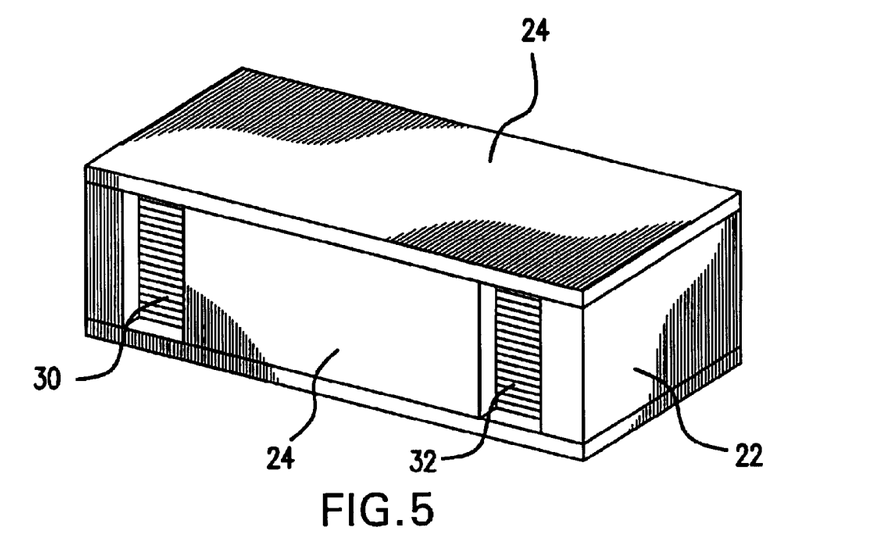
FIG. 5 provides a perspective view of the assembled heat exchanger of the present invention, before the heat exchanger has been put into a metal container.

FIGS. 4 and 5 show further details of the assembly of the heat exchanger of the present invention. FIG. 4 shows, in an exploded perspective view, a stack 20 comprising the folded foil as described above, and the pieces of material used to block off portions of the stack. End pieces 22 block off the ends corresponding to longitudinal edges 7, and side pieces 24 block off the remainder of the heat exchanger except for those areas that will become the inlets and outlets for the gas streams.

The material used to block off selected portions of the stack is preferably an insulating material, in the form of a blanket. A preferred material for this purpose is sold under the trademark Fiberfrax, available from the Unifrax Corporation. Fiberfrax is a ceramic fiber blanket material, the fibers being combinations of alumina and silica fibers. This material is commonly used for insulation in high-temperature environments. In the present invention, it is desirable not only to block off portions of the stack, but also to prevent heat loss to the outside environment. Moreover, it is helpful to use material that has the form of a blanket, because the blanket provides a cushion between the stack 20 and the metal container that will enclose the completed heat exchanger.

The invention is not limited to the use of Fiberfrax, or to any other particular material. Other means or materials for blocking the desired portions of the stack, and/or insulating the heat exchanger, can be used.

FIG. 5 shows the heat exchanger with the pieces of Fiberfrax, or other material, attached, but before the unit has been enclosed by a metal container. The Fiberfrax pieces have been cut so as to define openings 30 and 32 which correspond to the flat areas of the foil, insuring that gas will flow in the manner shown in FIGS. 3a and 3b. Similar openings on the opposite side of the exchanger provided, but are not visible in the view of FIG. 5.

Figure 6:
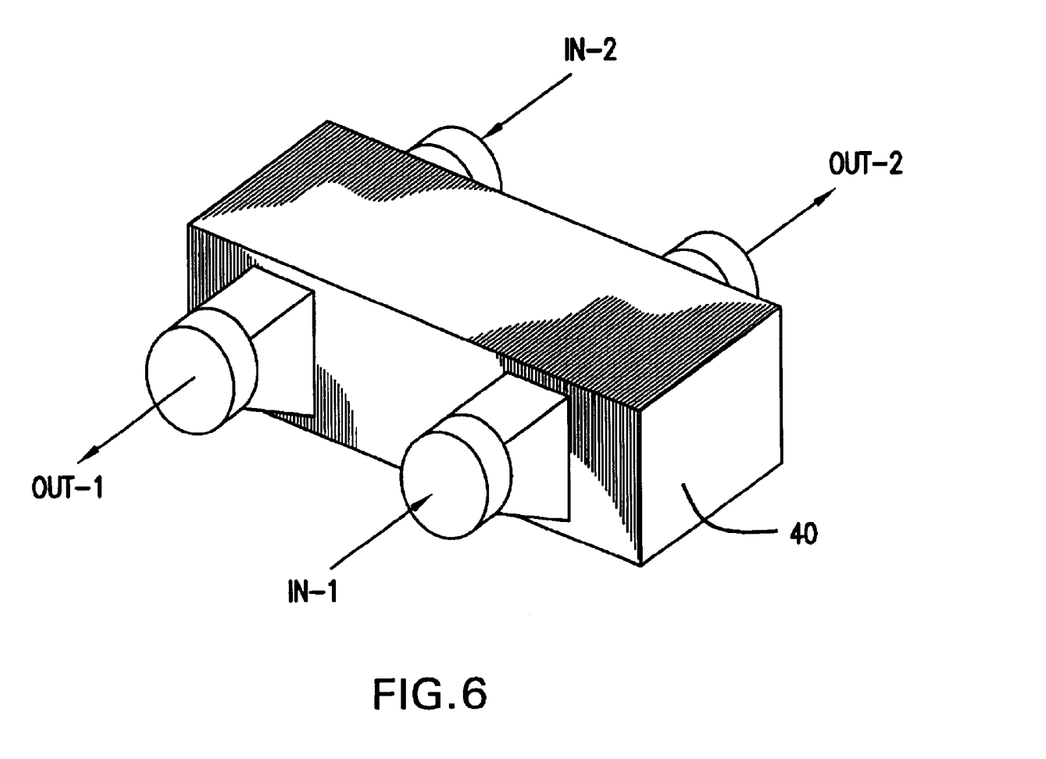
FIG. 6 provides a perspective view showing the heat exchanger in its container, and showing the external ports which allow gas streams to flow into and out of the two sides of the heat exchanger.

FIG. 6 shows the heat exchanger enclosed in a metal container 40. The container defines a pair of inlet ports and a pair of outlet ports. Note that in the embodiment shown, the heat exchanger is designed for countercurrent flow. That is, the second stream flows in the opposite direction, inside the exchanger, to that of the first stream. To achieve concurrent flow, one can simply reverse the ports IN-2 and OUT-2 (or the ports IN-1 and OUT-1), in which case the first and second gas streams will enter the heat exchanger from the same side, and will flow in the same direction, within the exchanger.

Figure 7:
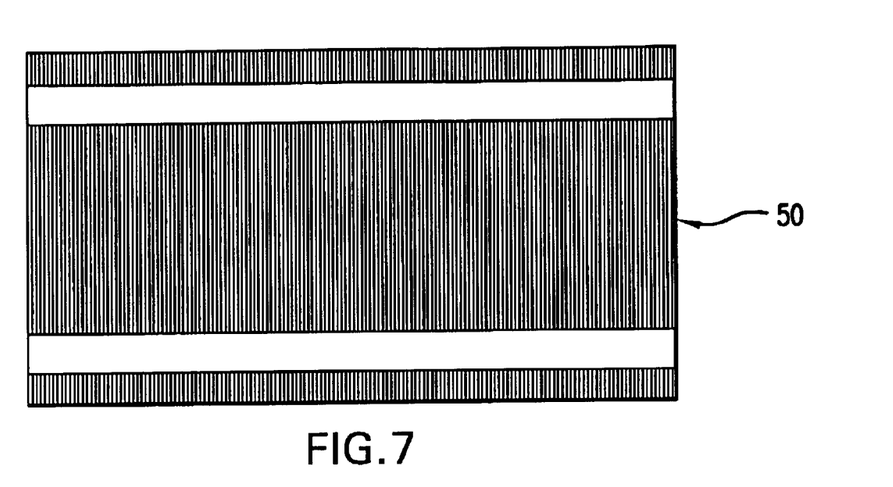
FIG. 7 provides a plan view of a piece of metal foil used to make another embodiment of the present invention, wherein the foil has straight corrugations.
Figure 8A:
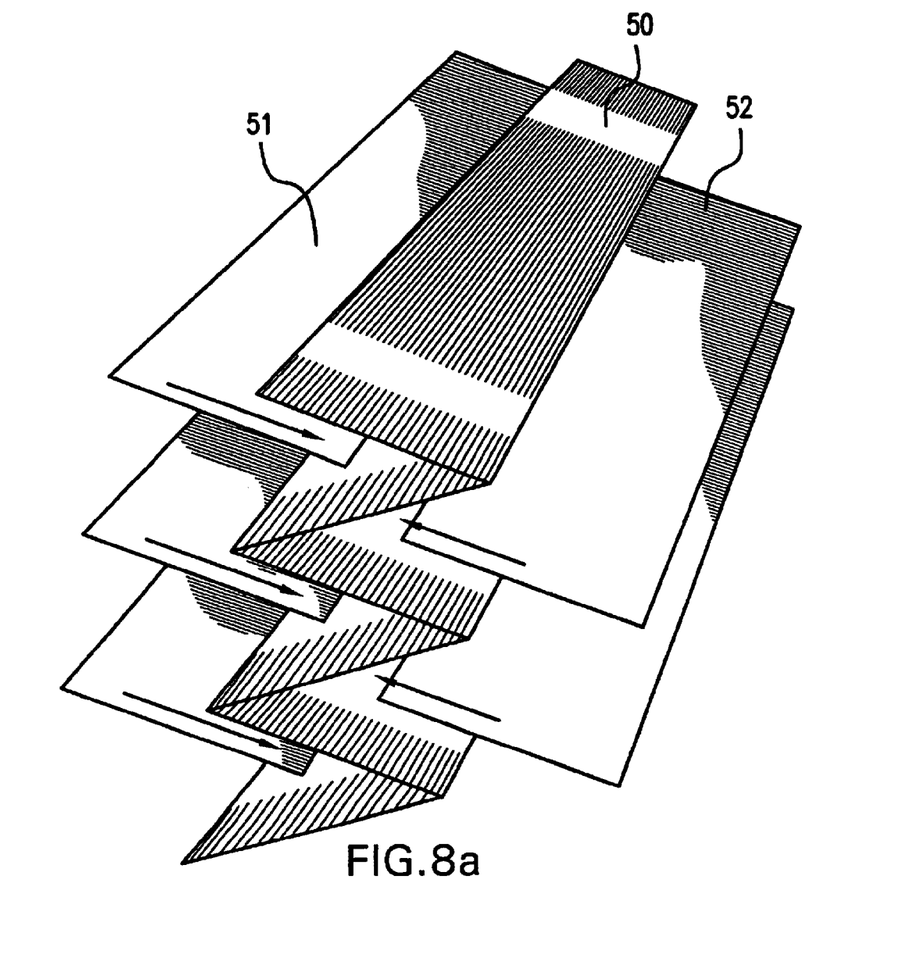
FIGS. 8a and 8b provide exploded perspective views of alternative embodiments of the heat exchanger of the present invention, wherein cut pieces are inserted into the folds of a zig-zag structure.
Figure 8B:
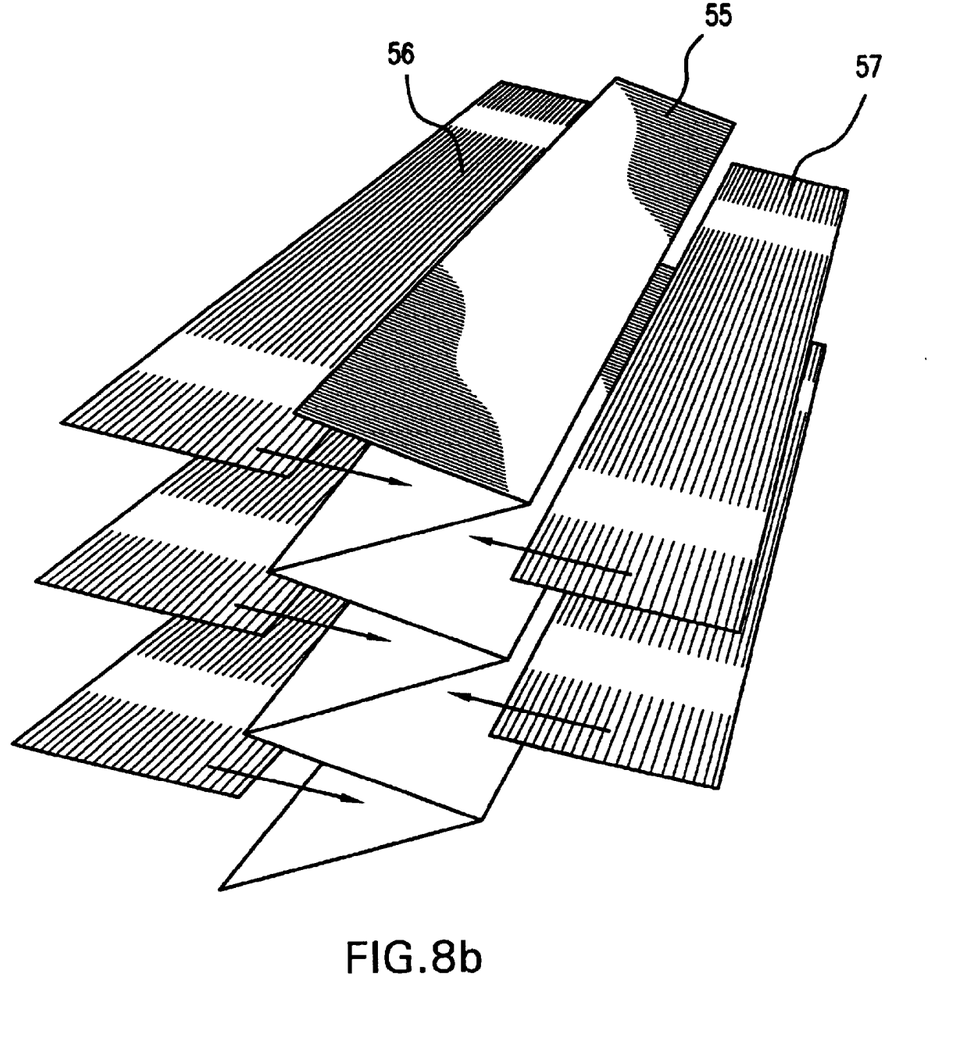

FIGS. 7 and 8a–8b show alternative embodiments of the heat exchanger of the present invention. FIG. 7 provides a plan view of foil 50 used in these embodiments. Foil 50 has corrugations interrupted by uncorrugated areas, similar to the structure of FIG. 1, except that the corrugations are straight, and not of a herringbone or skew arrangement. That is, the corrugations are perpendicular to the longitudinal axis of the foil.

As shown in FIG. 8a, the foil 50 is folded back and forth upon itself. A plurality of cut, flat sheets 51 of uncorrugated metal foil are placed in the folds on the left-hand side, and a plurality of similarly cut, flat sheets 52 of uncorrugated metal foil are placed in the folds on the right-hand side. As before, both sides of sheet 50 are coated with catalyst. The catalyst coatings on the two sides of the sheet may be the same or different. If the heat exchanger is to be used for steam reforming, one side (which may be called side A) is coated with Catalyst A, and the other side (side B) is coated with Catalyst B. If the left-hand portion of the folded sheet 50 is coated with Catalyst A, then both sides of each of the flat sheets 51 are also coated with Catalyst A. If the right-hand portion of the folded sheet 50 is coated with Catalyst B, then both sides of each of the flat sheets 52 are also coated with Catalyst B.

In FIG. 8b, the folded structure is formed of flat sheet 55, while the separate pieces 56 and 57 are cut from a corrugated piece of foil such as that shown in FIG. 7. In this case, assuming that the heat exchanger again requires two different catalysts, the flat piece 55 has a different coating on its two sides, while the cut pieces 56 on the left-hand side are coated on both sides with one catalyst, and the cut pieces 57 on the right-hand side are coated on both sides with the other catalyst. Again, the catalyst coating on a given cut piece is the same as the catalyst coating of the fold into which that cut piece is inserted. Each cut piece can be viewed as having a longitudinal axis which was formerly the transverse axis of the uncut piece 50. The corrugations on each cut piece are therefore substantially parallel to the longitudinal axis of the cut piece, and thus define straight corrugations.

The primary advantage of the embodiments of FIGS. 7 and 8a–8b is that both of these embodiments provide a heat exchanger having straight channels for gas flow. A heat exchanger having angled channels, such as those formed by herringbone or skew corrugations, exhibits an inherently larger pressure drop than an exchanger having straight channels. The embodiments of FIGS. 8a and 8b are therefore especially useful in applications requiring that the pressure drop be minimized.

The disadvantage of the embodiments of FIGS. 7 and 8a–8b is that they require multiple pieces. One must prepare three different kinds of coated foil, and one must do additional cutting and assembling, as compared with the embodiment of FIGS. 1–6. Moreover, the interspersed cut sheet may overheat in some combustion applications, because in these embodiments, there are effectively two channels of one kind which are interleaved with two channels of the other kind. In the embodiment of FIGS. 1–6, by contrast, each channel of one kind (i.e. having one kind of catalyst) is interleaved with a channel of the other kind.

All of the above-described embodiments use a piece of corrugated foil having uncorrugated areas as shown in FIGS. 1 and 7. These uncorrugated areas could be produced simply by selectively pressing the corrugated piece so as to remove the corrugations in the desired region. Alternatively, and more preferably, the piece can be corrugated with a specially-designed tool that imparts corrugations only in the desired regions.

The heat exchanger of the present invention has several important advantages over the prior art. The exchanger provides many channels, and a very large effective surface area on which the desired reactions can occur. The exchanger can be conveniently made using thin metal foils, of the order of 0.002–0.004 inches in thickness, as compared with conventional heat exchangers made from plates of relatively thick metal. Typical thicknesses of the metal in conventional heat exchangers may be 0.010 inches or more. The thin foil is advantageous because it promotes better heat transfer.

The present invention also has the advantage of relative ease of construction. There is very little welding required, especially for the embodiment of FIGS. 1–6. In prior art heat exchangers, it is necessary to weld many plates, and the welding must be done very carefully to prevent gas leaks.

The heat exchanger of the present invention also can be easily coated with a catalyst. As explained above, the catalyst coating can be applied to the flat sheet of foil, even before it is corrugated. It is therefore very easy to do the coating, and it is easy to provide a first coating on one side and a different coating on the other side. When the foil has been folded, and the exchanger completed, all of the desired internal surfaces are fully coated. By contrast, it is very difficult to coat all interior surfaces of a completed conventional heat exchanger. Thus, the present invention is especially advantageous in making heat exchangers where any catalyst coating is required.

The heat exchanger of the present invention is especially useful in steam reforming applications, in which heat is needed to drive a catalytic process. It is also useful in other fuel reforming applications, such as catalytic partial oxidation, where heat must be removed from the catalytic reaction. It is also useful in various catalytic combustion processes, as it is possible to perform controlled-temperature combustion on one side of the foil, even if the reaction is highly exothermic, by regulating air flow on the other side of the foil.

The present invention can also be used as a generator of hot air (or of some other hot gas), by combusting a fuel on one side of the foil, and transferring the heat produced to air or other gas flowing on the other side. Thus, the invention could be used in a home furnace.

It may also be possible to use the present invention as an air conditioner. If an endothermic catalytic process is operated on one side, heat can be withdrawn from air or gas flowing on the other side, thereby cooling the latter stream.

The invention can be modified in ways that will be apparent to the reader skilled in the art. Such modifications should be considered within the spirit and scope of the following claims.

What is claimed is:

1. A heat exchanger comprising:
   a) a piece of metal having a length and a pair of longitudinal edges, the piece being corrugated except along a pair of flat areas, the flat areas extending along substantially all of the length of the piece, the flat areas being generally parallel to and spaced apart from said longitudinal edges,
   b) the metal being folded back and forth upon itself to define a zig-zag pattern, and
   c) the longitudinal edges being blocked off to prevent gas from entering through said edges.

2. The heat exchanger of claim 1, wherein the folded piece of metal is enclosed within a metal container.

3. The heat exchanger of claim 2, wherein the container defines a pair of inlet ports and a pair of outlet ports, wherein a first inlet port and a first outlet port provide fluid communication with the flat areas on a first side of said piece of metal, and wherein a second inlet port and a second outlet port provide fluid communication with the flat areas on a second side of said piece of metal.

4. The heat exchanger of claim 2, wherein the longitudinal edges are blocked off by an insulating blanket material disposed between the folded piece of metal and the container.

5. The heat exchanger of claim 2, wherein the folded piece of metal is enclosed by a plurality of sections formed of an insulating blanket material, the blanket material being located inside the container.

6. The heat exchanger of claim 1, wherein the piece of metal has herringbone corrugations.

7. The heat exchanger of claim 1, wherein the piece of metal has a longitudinal axis, and wherein the piece of metal has corrugations that are non-perpendicular to the longitudinal axis of the piece of metal.

8. The heat exchanger of claim 1, wherein the piece of metal has a longitudinal axis, and wherein the piece of metal has corrugations that are perpendicular to the longitudinal axis of the piece of metal.

9. The heat exchanger of claim 1, wherein at least one side of the piece of metal is coated with a catalyst.

10. The heat exchanger of claim 1, wherein a first side of the piece of metal is coated with a first catalyst, and wherein a second side of the piece of metal is coated with a second catalyst, and where the first and second catalysts are different.

11. A heat exchanger comprising:
    a) a piece of metal having a length, a longitudinal axis and a pair of longitudinal edges, the piece having corrugations which are substantially perpendicular to the longitudinal axis, the piece being uncorrugated along a pair of flat areas, the flat areas extending alone substantially all of the length of the piece, the flat areas being generally parallel to and spaced apart from said longitudinal edges,
    b) the metal piece being folded back and forth upon itself to define a zig-zag pattern having a plurality of folds,
    c) a plurality of flat strips located within said folds, and
    d) the longitudinal edges being blocked off to prevent gas flow from entering through said edges.

12. The heat exchanger of claim 11, wherein the folded piece of metal and the flat strips are enclosed within a metal container.

13. The heat exchanger of claim 12, wherein the container defines a pair of inlet ports and a pair of outlet ports, wherein a first inlet port and a first outlet port provide fluid communication with the flat areas on a first side of said piece of metal, and wherein a second inlet port and a second outlet port provide fluid communication with the flat areas on a second side of said piece of metal.

14. The heat exchanger of claim 12, wherein the longitudinal edges are blocked off by an insulating blanket material disposed between the folded piece of metal and the container.

15. The heat exchanger of claim 12, wherein the folded piece of metal is enclosed by a plurality of sections formed of an insulating blanket material, the blanket material being located inside the container.

16. The heat exchanger of claim 11, wherein at least one side of the piece of metal is coated with a catalyst.

17. The heat exchanger of claim 11, wherein a first side of the piece of metal is coated with a first catalyst, and wherein a second side of the piece of metal is coated with a second catalyst, and where the first and second catalysts are different.

18. The heat exchanger of claim 17, wherein at least some of the flat strips are coated with a catalyst corresponding to a catalyst coating on the fold in which the flat strip is located.

19. A heat exchanger comprising:
    a) an uncorrugated piece of metal which is folded back and forth upon itself to define a zig-zag pattern having a plurality of folds,
    b) a plurality of cut strips located within said folds, each cut strip having a longitudinal axis and a pair of ends, each cut strip having corrugations parallel to the longitudinal axis except for a pair of uncorrugated areas near the ends of the cut strip, c) the ends of the cut strips being blocked off to prevent gas flow from entering through said ends.

20. The heat exchanger of claim 19, wherein the folded piece of metal and the cut strips are enclosed within a metal container.

21. The heat exchanger of claim 20, wherein the container defines a pair of inlet ports and a pair of outlet ports, wherein a first inlet port and a first outlet port provide fluid communication with the uncorrugated areas on a first side of said piece of metal, and wherein a second inlet port and a second outlet port provide fluid communication with the uncorrugated areas on a second side of said piece of metal.

22. The heat exchanger of claim 20, wherein the ends are blocked off by an insulating blanket material disposed between the folded piece of metal and the container.

23. The heat exchanger of claim 20, wherein the folded piece of metal is enclosed by a plurality of sections formed of an insulating blanket material, the blanket material being located inside the container.

24. The heat exchanger of claim 19, wherein at least one side of the piece of metal is coated with a catalyst.

25. The heat exchanger of claim 19, wherein a first side of the piece of metal is coated with a first catalyst, and wherein a second side of the piece of metal is coated with a second catalyst, and where the first and second catalysts are different.

26. The heat exchanger of claim 25, wherein at least same of the cut strips are coated with a catalyst corresponding to a catalyst coating on the fold in which the cut strip is located.

27. A method of making a heat exchanger, comprising:

a) corrugating a piece of metal having a length and a pair of longitudinal edges, the corrugating being done everywhere on the piece of metal except along a pair of areas, which areas extend along substantially all of the length of the piece, and which areas are generally parallel to and spaced apart from the longitudinal edges, b) folding the piece of metal back and forth upon itself to define a zig-zag pattern, and c) blocking off the longitudinal edges to prevent gas from entering through said edges.

28. The method of claim 27, wherein the corrugating step is preceded by the step of coating at least one side of the piece of metal with catalyst.

29. The method of claim 27, wherein the corrugating step is preceded by the step of coating both sides of the piece of metal with catalyst, and wherein different coatings are applied to different sides of the metal piece.

30. The method of claim 27, further comprising enclosing the folded piece of metal within a metal container.

31. The method of claim 30, wherein the blocking off includes mounting an insulating blanket material around the folded piece of metal, such that the blanket material is located between the folded piece of metal and the container.

32. A method of making a heat exchanger, comprising:

a) corrugating a piece of metal having a length and a pair of longitudinal edges, the corrugating being done everywhere on the piece of metal except alone a pair of areas, which areas extend alone substantially all of the length of the piece, and which areas are generally parallel to and spaced apart from the longitudinal edges, b) folding the piece of metal back and forth upon itself to define a zig-zag pattern, c) inserting cut, uncorrugated pieces of metal into folds defined by the folded piece of metal, and d) blocking off the longitudinal edges to prevent gas from entering through said edges.

33. The method of claim 32, wherein the corrugating step is preceded by the step of coating at least one side of the piece of metal with catalyst.

34. The method of claim 32, wherein the corrugating step is preceded by the step of coating both sides of the piece of metal with catalyst, and wherein different coatings are applied to different sides of the metal piece.

35. The method of claim 33, further comprising the step of coating at least one side of each cut piece with a catalyst corresponding to a catalyst applied to a fold in which said cut piece is inserted.

36. The method of claim 32, further comprising enclosing the folded piece of metal within a metal container.

37. The method of claim 33, wherein the blocking off includes mounting an insulating blanket material around the folded piece of metal, such that the blanket material is located between the folded piece of metal and the container.

38. A method of making a heat exchanger, comprising:

a) folding an uncorrugated piece of metal back and forth upon itself to define a zig-zag pattern, b) inserting cut pieces of metal into folds defined by the folded piece of metal, the cut pieces having ends, and being corrugated except in a pair of areas near the ends of said cut pieces, and c) blocking off the ends of the cut pieces to prevent gas from entering through said edges.

39. The method of claim 38, wherein the corrugating step is preceded by the step of coating at least one side of the piece of metal with catalyst.

40. The method of claim 38, wherein the corrugating step is preceded by the step of coating both sides of the piece of metal with catalyst, and wherein different coatings are applied to different sides of the metal piece.

41. The method of claim 39, further comprising the step of coating at least one side of each cut piece with a catalyst corresponding to a catalyst applied to a fold in which said cut piece is inserted.

42. The method of claim 38, further comprising enclosing the folded piece of metal within a metal container.

43. The method of claim 42, wherein the blocking off includes mounting an insulating blanket material around the folded piece of metal, such that the blanket material is located between the folded piece of metal and the container.

44. A heat exchanger comprising:

a) a piece of metal having a longitudinal axis and a pair of longitudinal edges, the piece having corrugations which are substantially perpendicular to the longitudinal axis, the piece being un-corrugated along a pair of flat areas located in a vicinity of said longitudinal edges, b) the metal piece being folded back and forth upon itself to define a zig-zag pattern having a plurality of folds, c) a plurality of flat strips located within said folds, and d) the longitudinal edges being blocked off to prevent gas flow from entering through said edges, wherein a first side of the piece of metal is coated with a first catalyst, and wherein a second side of the piece of metal is coated with a second catalyst, and where the first and second catalysts are different, wherein at least some of the flat strips are coated with a catalyst corresponding to a catalyst coating on the fold in which the flat strip is located.

45. A method of making a heat exchanger, comprising:
a) corrugating a piece of metal having a pair of longitudinal edges, the corrugating being done everywhere on the piece of metal except along a pair of areas located in a vicinity of the longitudinal edges,
b) folding the piece of metal back and forth upon itself to define a zig-zag pattern,
c) inserting cut, uncorrugated pieces of metal into folds defined by the folded piece of metal, and
d) blocking off the longitudinal edges to prevent gas from entering through said edges, wherein the corrugating step is preceded by the step of coating at least one side of the piece of metal with catalyst, and further comprising the step of coating at least one side of each cut piece with a catalyst corresponding to a catalyst applied to a fold in which said cut piece is inserted.

* * * * *